(12) United States Patent
Parks et al.

(10) Patent No.: US 8,914,479 B2
(45) Date of Patent: Dec. 16, 2014

(54) IMAGE-PROCESSING SYSTEM AND IMAGE-PROCESSING METHOD

(75) Inventors: Benjamin John Parks, Reading (GB); Pierre-Jean Champault, London (GB); Ricardo Jose Teixeira dos Santos, Windsor (GB)

(73) Assignee: Canon Europa N.V. (NL)

( * ) Notice: Subject to any disclaimer, the term of this patent is extended or adjusted under 35 U.S.C. 154(b) by 554 days.

(21) Appl. No.: 13/238,204

(22) Filed: Sep. 21, 2011

(65) Prior Publication Data
US 2012/0079081 A1 Mar. 29, 2012

(30) Foreign Application Priority Data
Sep. 27, 2010 (GB) .................................. 1016198.2

(51) Int. Cl.
*G06F 15/177* (2006.01)
(Continued)

(52) U.S. Cl.
CPC ............... *G06F 21/606* (2013.01); *H04W 4/02* (2013.01); *H04N 1/00228* (2013.01);
(Continued)

(58) Field of Classification Search
CPC ................... H04N 1/00474; H04L 29/08702; H04L 29/08981; H04L 29/06
USPC ......................................................... 709/220
See application file for complete search history.

(56) References Cited

U.S. PATENT DOCUMENTS

| 7,676,750 B2 | 3/2010 | Lindsey, Jr. et al. |
| 8,570,566 B2 | 10/2013 | St. Laurent et al. ......... 358/1.15 |

(Continued)

FOREIGN PATENT DOCUMENTS

| JP | 2006-072479 A | 3/2006 |
| JP | 2009-042807 A | 2/2009 |

(Continued)

OTHER PUBLICATIONS

Combined Search and Examination Report under Sections 17 and 18(3) dated Jan. 20, 2011, in Great Britain Application No. GB1016198.2.

(Continued)

*Primary Examiner* — Tauqir Hussain
(74) *Attorney, Agent, or Firm* — Fitzpatrick, Cella, Harper & Scinto

(57) ABSTRACT

An image-processing system comprising a peripheral device 10, a web server 12 associated with the peripheral device 10 an application server 13 and a mobile phone 11. The web server 12 is configured to send a registration request to register communication parameters of the peripheral device 10 in association with a piece of identification information at the application server 13. The mobile device 11 is configured to determine the piece of identification information and to send a request to the application server 13 with the determined piece of identification information. The application server 13 is configured to associate the registered details of the peripheral device 10 with the request from the mobile device 11 thereby allowing a connection to be configured between the mobile device 11 and the peripheral device 10.

15 Claims, 14 Drawing Sheets

(51) Int. Cl.
*G06F 15/16* (2006.01)
*H04W 4/02* (2009.01)
*G06F 3/12* (2006.01)
*H04L 29/08* (2006.01)
*G06F 21/43* (2013.01)
*H04N 1/32* (2006.01)
*G06F 21/60* (2013.01)
*H04N 1/327* (2006.01)
*G06F 21/31* (2013.01)
*H04N 1/00* (2006.01)

(52) U.S. Cl.
CPC ............ *G06F 3/1236* (2013.01); *H04L 67/28* (2013.01); *H04L 67/34* (2013.01); *G06F 3/1226* (2013.01); *H04N 2201/3204* (2013.01); *H04N 2201/3205* (2013.01); *G06F 21/43* (2013.01); *G06F 3/1268* (2013.01); *H04N 2201/3278* (2013.01); *H04N 1/00225* (2013.01); *G06F 3/1222* (2013.01); *H04N 1/32117* (2013.01); *H04N 1/00244* (2013.01); *H04N 1/00474* (2013.01); *H04N 2201/0094* (2013.01); *H04N 1/00464* (2013.01); *H04N 1/32767* (2013.01); *G06F 3/1204* (2013.01); *H04N 1/00424* (2013.01); *H04N 2201/3269* (2013.01); *G06F 3/1238* (2013.01); *H04N 2201/3273* (2013.01); *G06F 21/31* (2013.01); *G06F 3/1288* (2013.01); *H04N 1/00307* (2013.01); *G06F 21/608* (2013.01); *G06F 3/1292* (2013.01); *H04L 67/06* (2013.01)

USPC .......................... 709/220; 358/1.15; 358/504

(56) References Cited

U.S. PATENT DOCUMENTS

| | | | |
|---|---|---|---|
| 2004/0125401 A1 | 7/2004 | Earl et al. | 358/1.15 |
| 2005/0026593 A1 | 2/2005 | Anderson et al. | |
| 2008/0184162 A1 | 7/2008 | Lindsey et al. | |
| 2009/0021776 A1* | 1/2009 | Dolan et al. | 358/1.15 |
| 2009/0033972 A1* | 2/2009 | Kato | 358/1.13 |
| 2009/0034731 A1* | 2/2009 | Oshima | 380/270 |
| 2009/0036056 A1* | 2/2009 | Oshima et al. | 455/41.3 |
| 2009/0052348 A1* | 2/2009 | Kato et al. | 370/254 |
| 2009/0066998 A1* | 3/2009 | Kato | 358/1.15 |
| 2010/0069008 A1* | 3/2010 | Oshima et al. | 455/41.3 |
| 2011/0085196 A1* | 4/2011 | Liu et al. | 358/1.15 |

FOREIGN PATENT DOCUMENTS

| | | |
|---|---|---|
| JP | 2010-049579 A | 3/2010 |
| WO | 98/38761 A2 | 9/1998 |
| WO | 2007/003893 A2 | 1/2007 |
| WO | 2007/026938 A1 | 3/2007 |
| WO | 2010/079192 A1 | 7/2010 |
| WO | 2012/034212 A1 | 3/2012 |

OTHER PUBLICATIONS

Great Britain Intellectual Property Office, Combined Search and Examination Report dated Oct. 27, 2011, in connection with Application No. GB1116448.0 (7 pages).

* cited by examiner

IMAGE-PROCESSING SYSTEM AND IMAGE-PROCESSING METHOD

BACKGROUND OF THE INVENTION

1. Field of the Invention

The present invention relates to an image-processing system and an image-processing method. In particular, the present invention relates to communication between peripheral devices, such as printers, scanners, fax machines, etc., and mobile devices, such as mobile telephones, PDAs, etc.

2. Description of the Related Art

Mobile devices, such as mobile telephones and PDAs, are widely used in modern society. Similarly, large MFP (Multifunction Peripheral) devices are also widely used in office environments, print rooms, universities, etc. However, a practical method for printing from mobile phones to MFPs or for scanning documents to mobile phones has been lacking.

WO 2007/026938 describes a mechanism for scanning to and printing from mobile phones. The mobile phone communicates with an MFP using an RFID card, which allows exchange of wireless network configuration parameters. Based on the wireless configuration parameters communication between the mobile phone and the MFP is configured to allow jobs to be printed from the mobile phone or documents to be scanned to the mobile phone.

Whilst the teaching of WO 2007/026938 goes some way towards allowing mobile printing, it is inconvenient because it requires a non-contact IC card unit (contactless smart card) to be built into the mobile phone. Mobile phones and other devices with such built-in contactless smart cards are not yet in wide-spread use.

Modern mobile phones (so called smart phones) now include operating systems and the ability to download and install software applications.

SUMMARY OF THE INVENTION

It is an object of the present invention to provide an image-processing system and an image-processing method that allows communication between mobile devices and peripheral devices without the need for dedicated hardware in the mobile device.

According to a first aspect of the present invention there is provided an image-processing system comprising: a peripheral apparatus including a peripheral device, the peripheral apparatus being configured to send a registration request to register communication parameters of the peripheral device in association with a piece of identification information;

a server configured to receive the registration request and to register the communication parameters of the peripheral device in association with the piece of identification information; and a mobile device configured to determine the piece of identification information and to send a request to the server with the determined piece of identification information, wherein the server is configured to associate the registered details of the peripheral device with the request from the mobile device thereby allowing a connection to be configured between the mobile device and the peripheral device.

Preferably the connection between the mobile device and the peripheral device is configured by at least one of the mobile device and the peripheral apparatus retrieving communication parameters stored on the server.

In some embodiments, the connection between the mobile device and the peripheral device is a direct connection such that the mobile device and the peripheral device can communicate directly with each other. In other embodiments, the connection between the mobile device and the peripheral device is an indirect connection. The indirect connection may be a connection involving one or more servers.

In some embodiments, the piece of identification information is a code, the peripheral device is configured to provide the code to a user, and the mobile device is configured to determine the identification information by entry of the code into the mobile device by a user. Preferably the code is displayed on a display of the peripheral device. In some embodiments the code is a number.

In other embodiments, the peripheral device is configured to provide a barcode or other machine-readable code encoding the piece of identification information; and the mobile device is configured to determine the piece of identification information by reading and decoding the barcode or other machine-readable code provided by the peripheral device.

In other embodiments the piece of identification information is derivable from a position of the peripheral device; and the mobile device is configured to determine the piece of identification information by detecting a position of the peripheral device. Preferably, the position of the peripheral device is determined using a position detection means in the mobile device. In some embodiments the position detection means is a global positioning sensor. Preferably the piece of identification information is a predetermined number of digits of location coordinates of the peripheral device.

In some embodiments, the mobile device is further configured to determine parameters to allow communication with the server. Preferably, the mobile device is configured to determine the parameters to allow communication with the server by reading a machine-readable code encoding an address of the server. In some embodiments the machine-readable code is a barcode.

In some embodiments the mobile device is a mobile phone, a PDA, a digital camera, a laptop computer, or other mobile device. In some embodiments the peripheral device is an MFP, a printer, a scanner or a fax machine.

In a further aspect of the present invention there is provided an image-processing method for an image-processing apparatus comprising a peripheral apparatus, a server and a mobile device, the peripheral apparatus comprising a peripheral device, the method comprising: the peripheral apparatus sending a registration request to register communication parameters of the peripheral device in association with a piece of identification information at the server; the server receiving the registration request and registering the communication parameters of the peripheral device in association with the piece of identification information; the mobile device determining the piece of identification information and sending a request to the server with the determined piece of identification information; and the server associating the registered details of the peripheral device with the request from the mobile device thereby allowing a connection to be configured between the mobile device and the peripheral device.

According to a further aspect of the present invention there is provided a mobile device comprising a printing/scanning function for sending a file for printing and/or for receiving a scanned file, the printing/scanning function including: means for reading and decoding a machine readable code in order to determine a piece of identification information; and means for sending a request to a server including the determined piece of identification information.

According to yet a further aspect of the present invention there is provided a method for printing from a mobile device comprising: reading and decoding a machine readable code in order to determine a piece of identification information; and sending a request to a server including the determined piece of identification information.

According to a yet further aspect of the present invention there is provided a peripheral apparatus comprising: a unit configured to provide a user with a piece of identification information in the form of a machine-readable code.

According to a yet further aspect of the present invention there is provided a method for a peripheral apparatus comprising: providing a user with a piece of identification information in the form of a machine readable code.

According to a yet further aspect of the present invention there is provided a server comprising: a code portion to receive a registration request from a peripheral apparatus including communication parameters for the peripheral apparatus; a code portion to register the peripheral apparatus in accordance with a received request in association with a piece of identification information; a code portion to receive a request from a mobile device including the piece of identification information; and a code portion to associate the registered peripheral apparatus with the request from the mobile device using the piece of identification information.

According to a yet further aspect of the present invention there is provided a method for a server comprising: receiving a registration request from a peripheral apparatus including communication parameters for the peripheral apparatus; registering the peripheral apparatus in association with a piece of identification information in accordance with a received request; receiving a request from a mobile device including the piece of identification information; and associating the registered peripheral apparatus with the request from the mobile device using the piece of identification information.

According to a yet further aspect of the present invention there is provided an image-processing system comprising: a peripheral apparatus including a peripheral device, the peripheral apparatus being configured to send a registration request to register communication parameters of the peripheral device in association with a piece of location information; a server configured to receive the registration request and to register the communication parameters of the peripheral device in association with the piece of location information; and a mobile device configured to determine its location and to send a request to the server with the determined mobile device location information, wherein the server is configured to identify the registered details of the peripheral device based on the mobile device location information in the request from the mobile device thereby allowing a connection to be configured between the mobile device and the peripheral device.

Preferably the server is configured to identify the peripheral device by determining that its registered location is within a predetermined distance of the mobile device location included in the request from the mobile device.

In some embodiments the server is configured so that, in a case that the server determines that a plurality of peripheral devices are within the predetermined distance of the mobile device location included in the request from the mobile device, the server causes a message to be displayed on the mobile device to cause a user to select one of the plurality of peripheral devices for connection.

According to a further aspect of the present invention there is provided an image-processing method for an image-processing system comprising a peripheral apparatus, a server and a mobile device, the peripheral apparatus including a peripheral device, the method comprising: the peripheral apparatus sending a registration request to the server to register communication parameters of the peripheral device in association with a piece of location information; the server receiving the registration request and registering the communication parameters of the peripheral device in association with the piece of location information; the mobile device determining its location and sending a request to the server with the determined mobile device location information; and the server identifying the registered details of the peripheral device based on the mobile device location information in the request from the mobile device thereby allowing a connection to be configured between the mobile device and the peripheral device.

BRIEF DESCRIPTION OF THE DRAWINGS

Embodiments of the present invention will now be described, by way of example only, with reference to the accompanying figures in which.

DESCRIPTION OF THE EMBODIMENTS

First Embodiment

Figure 1:
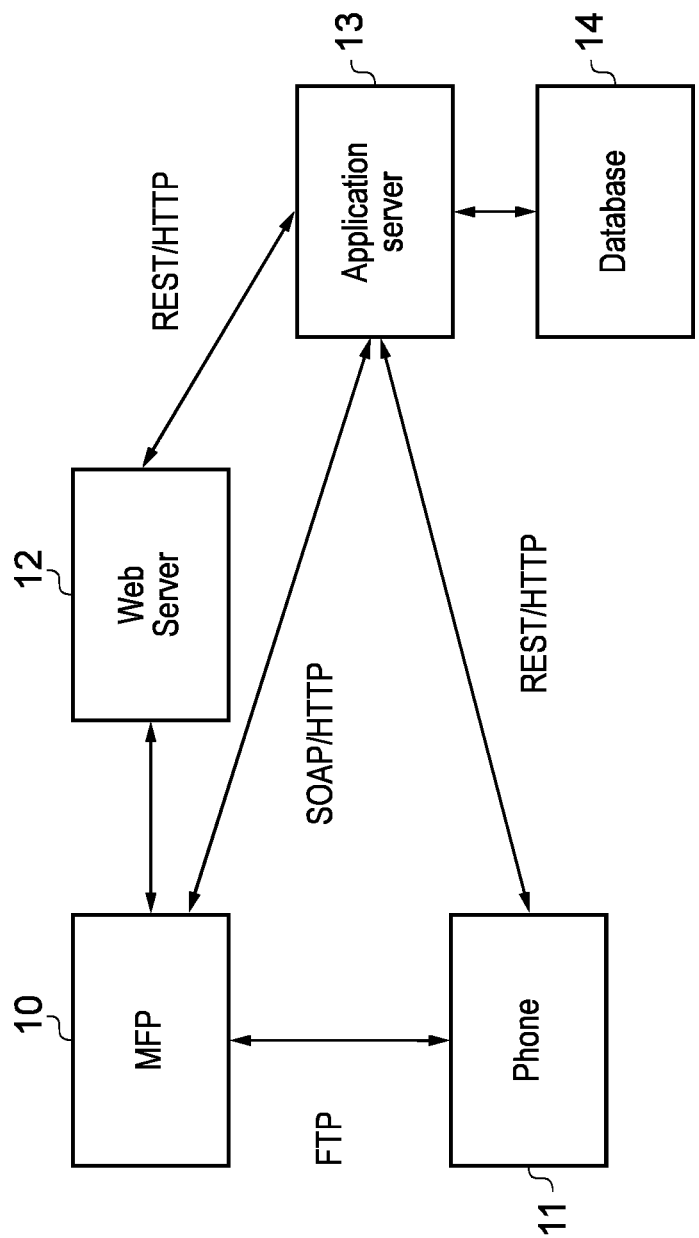
FIG. 1 shows architecture of the first embodiment.

FIG. 1 shows architecture of an image-processing system of the first embodiment. The image-processing system comprises an MFP (multi-function peripheral) 10 and a mobile phone 11. The MFP 10 has an associated web server 12, as will be explained in more detail below. The image-processing system further comprises an application server 13 and a database 14. The application server 13 and database 14 are shown separately in FIG. 1, but in other embodiments the database 14 may be stored on the application server 13.

Figure 2:
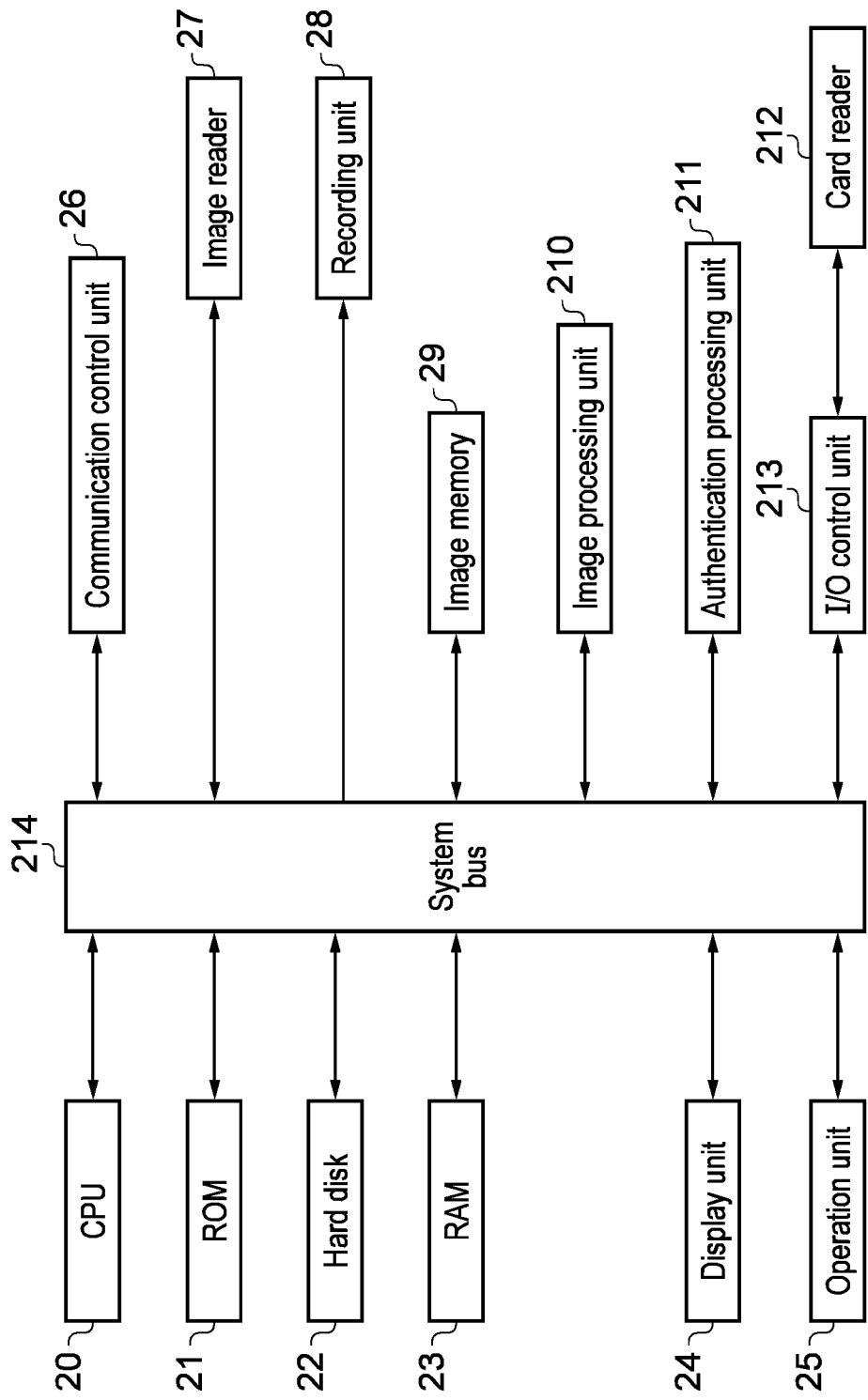
FIG. 2 shows hardware of an MFP.

FIG. 2 shows the hardware configuration of the MFP 10. The MFP comprises a CPU 20, a ROM 21, a hard disk drive 22, and a RAM 23. These components are standard hardware components for computers and other devices and perform their usual functions. The MFP 10 further comprises a display unit 24, an operation unit 25, a communication control unit 26, an image reader 27, a recording unit 28, an image memory 29, an image processing unit 210, an authentication unit 211, a card reader 212, and an I/O control unit 213. The display unit 24 is a touch-screen LCD display provided on the MFP 10 to allow a user to make selections and view information on the MFP 10. The operation unit 25 is a keypad and other buttons to allow a user to enter settings and other information to the MFP 10. The communication control unit 26 is provided to allow the MFP 10 to communicate over a LAN with the web server 12. The image reader 27 is a scanner that allows scanning of documents. The recording unit 28, shown in FIG. 2, represents parts of the MFP 10 dedicated to printing. The recording unit 28 functions to print image data onto a recording medium and output the recording medium for collection by a user. The image memory 29 is a memory provided for storage of image data during scanning by the image reader 27 or printing by the recording unit 28. The image-processing unit 210 represents various application specific integrated circuits (ASIC) provided in the MFP 10 in order to increase the speed of certain image processing operations, such as conversion of scanned R,G,B data into C,M,Y,K data during a copying operation. The authentication processing unit 211 is provided in order to authenticate user details received from the card reader 212. Data from the card reader 212 is received at the authentication unit 211 via an I/O control unit 213. The authentication unit may be implemented by software run using the CPU 20 and RAM 23 rather than as a separate hardware component. The components described above are interconnected via a system bus 214.

The MFP 10 runs an operating system. In this particular embodiment the operating systems is the MEAP operating system provided on MFP devices sold by Canon®. The operating system allows the running of JAVA applications and also includes a web interface as will be explained later.

Figure 3:
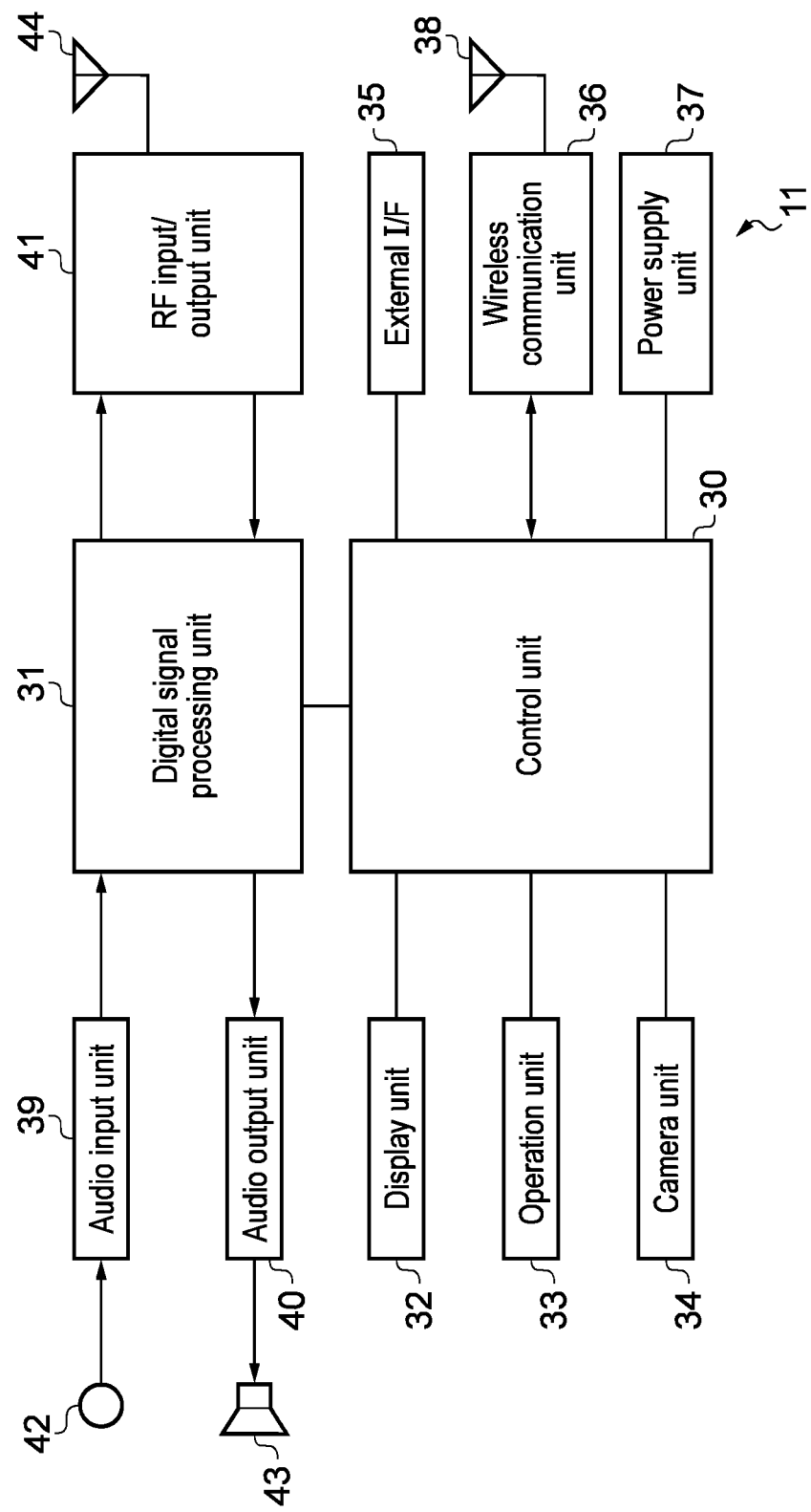
FIG. 3 shows hardware of a mobile phone.

FIG. 3 shows the hardware configuration of the mobile phone 11. The mobile phone 11 comprises a control unit 30 connected to a digital signal processing unit 31. The control unit 30 controls operation of a display unit 32, an operation unit 33, a camera unit 34, an external I/F 35, a wireless communication unit 36, and a power supply unit 37. The display unit comprises an LCD display for displaying information to a user of the phone 11. The operation unit 33 comprises a keypad and other operation buttons to allow a user to make inputs into the mobile phone 11. The camera unit 34 is a camera that is integrated into the phone 11 to allow a user to take pictures and to collect visual information. The external I/F is a port provided in the mobile phone 11 to allow the mobile phone 11 to communicate with other devices. In particular the external I/F allows the mobile phone 11 to be connected to a computer for the purposes of synchronizing data (contact details, calendar entries etc.) stored on the mobile phone 11 with data stored on the computer. The wireless communication unit 36 provides support for various wireless services. In particular the wireless communication unit 36 provides support for Wi-Fi communication. The wireless communication unit 36 is connected to an antenna 38. The power supply unit 37 includes a battery and a mechanism for charging the battery from an external power supply.

The digital signal processing unit 31 is connected to an audio input unit 39, an audio output unit 40, and an RF input/output unit 41. The audio input unit 39 is an analogue to digital processor for receiving and converting audio signals from a microphone 42. The audio output unit 40 is a digital to analogue processor for receiving and converting digital signals into an analogue output to be output by a speaker 43. The RF input/output unit 41 is connected to an antenna 44 and is used to allow the mobile phone 11 to communicate with a local mobile phone station. The audio input unit 39, audio output unit 40, digital signal processing unit 31 and RF input/output unit 41 allow the mobile phone 11 to operate as a portable telephone.

The mobile phone 11 is a so called 'smart phone' and runs Google® Android® operating system. In other embodiments other types of phone can be used, including those running different mobile phone operating systems.

Figure 4:
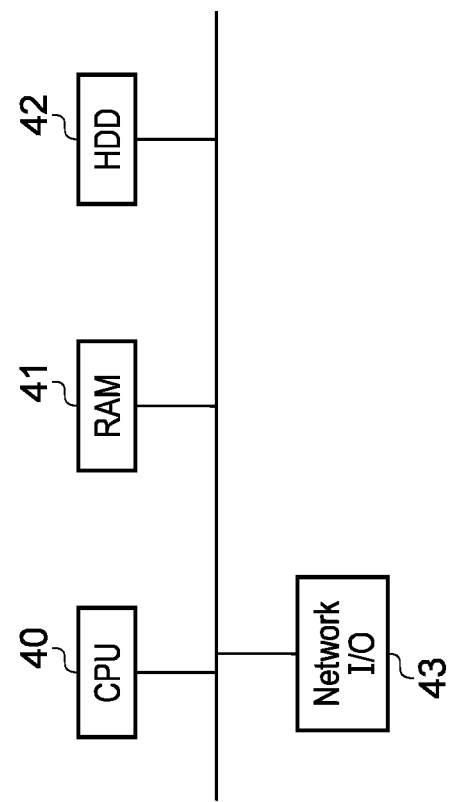
FIG. 4 shows server hardware.

The web server 12 and application server 13 comprise typical server hardware exemplified by FIG. 4. The server hardware includes a CPU 40, RAM 41, a hard disk drive 42 and a network I/O 43. The network I/O 43 allows the web server 12 and application server 13 to communicate over a LAN.

Additional details of the image processing system will be described below. The configuration of the first embodiment is suitable for use for the purposes of demonstration of printing from and scanning to mobile phones in an exhibition or show room environment. A commercial implementation of the present invention will be described in the fourth embodiment.

Referring again to FIG. 1, the MFP 10, web server 12, application server 13, and mobile phone 11 are able to communicate with each other over a single Wi-Fi network.

Figure 5:
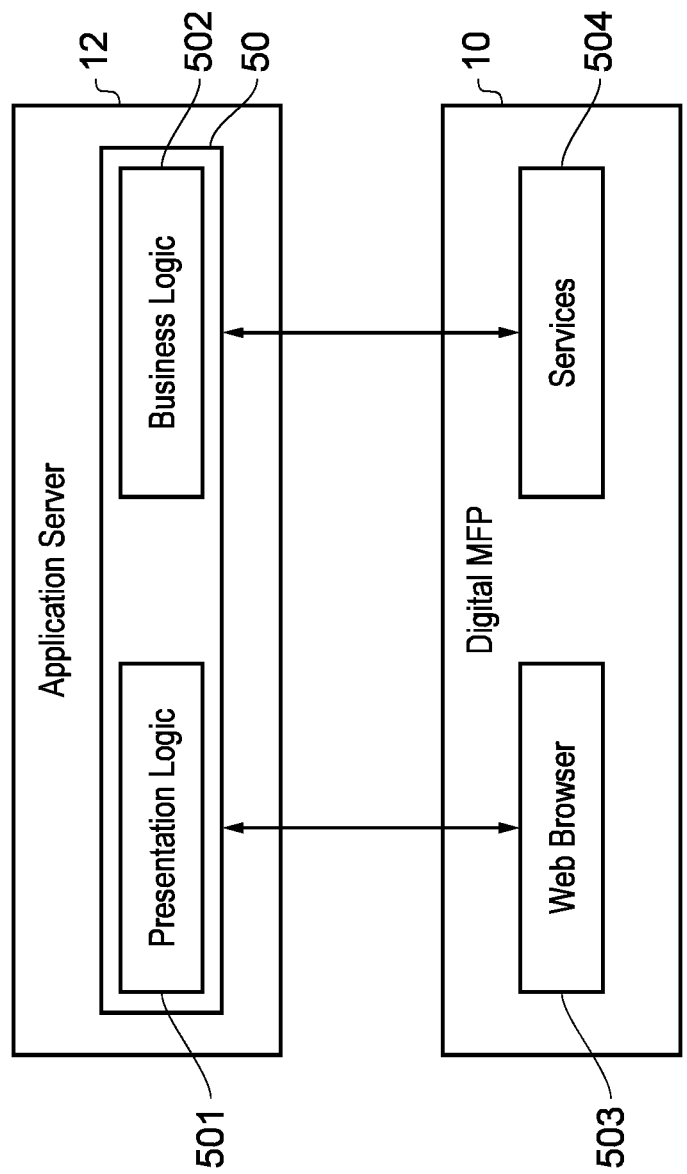
FIG. 5 shows communications between a web server and the MFP.

As mentioned above, the MFP 10 and the web server 12 are associated with each other. In particular, a web application 50 is run on the web server 12 in order to control operations on the MFP 10. FIG. 5 shows the web application 50, which includes presentation logic 501 and business logic 502. Installed on the MFP 10 is a web browser 503 which receives HTML web pages to be displayed to a user from the presentation logic 501. Also installed on the MFP 10 is a service interface 504 to allow the business logic 502 of the web application 50 to access various services of the MFP 10. For example, the business logic 502 may send commands to the service interface 504 (SOAP interface) to cause the scanner to perform a scanning operation.

A RESTful (Representational State Transfer) interface is provided between the web server 12, application server 13 and mobile phone 11. It is recalled that all three devices (web server 13, application server 14, and mobile phone 11) can communicate with each other via Wi-Fi over a single network. The REST interface is defined as follows. In the following description the resource is given, then a description of the resource, followed by the HTTP request method and a description of the request method:
/sessionusers/{identification information}/session
A session object for given identification information. From the session a list of transfers can be obtained.
GET: gets the session
/session/{sessionid}
A session object containing a collection of transfers registered for a given session.
GET: gets the session
PUT: updates the session
/transfers/
A collection of all transfers
POST: Registers a new transfer
/transfers/{transferid}
A transfer contains a device and destination object.
GET: gets the transfer
PUT: updates the transfer
/destinations/
A collection of FTP destinations
POST: registers a new destination
/destinations/{destinationid}
A destination with the specified ID. The destination contains information about the FTP to which the scanned document will be sent.
GET: gets a destination
PUT: updates a destination
/devices/{deviceid}
A device. The device contains information about a SOAP service endpoint which is used for scanning a document. It also includes the address for printing.
GET: gets the device.

Payloads of transactions conducted via the REST interface are formatted in XML or JSON.

The application server can also communicate with the MFP 10 via a SOAP/HTTP interface (services 504), allowing the application server to access services, such as printing, faxing, or scanning, on the MFP 10.

Figure 6:
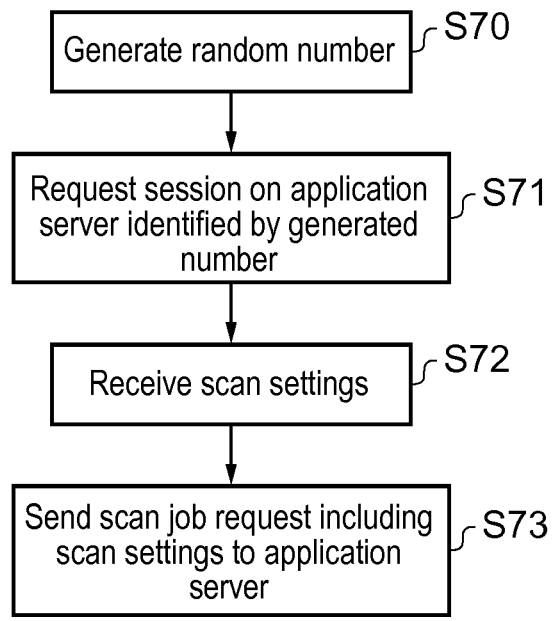
FIG. 6 shows steps performed at the web server.
Figure 7:
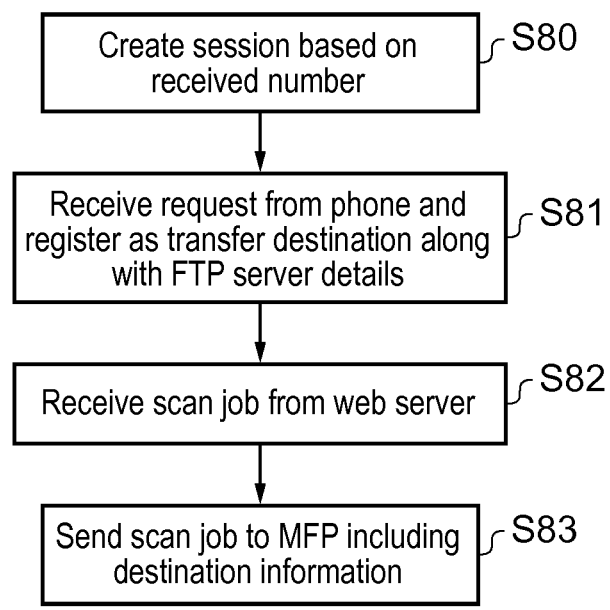
FIG. 7 shows steps performed at an application server.
Figure 8:
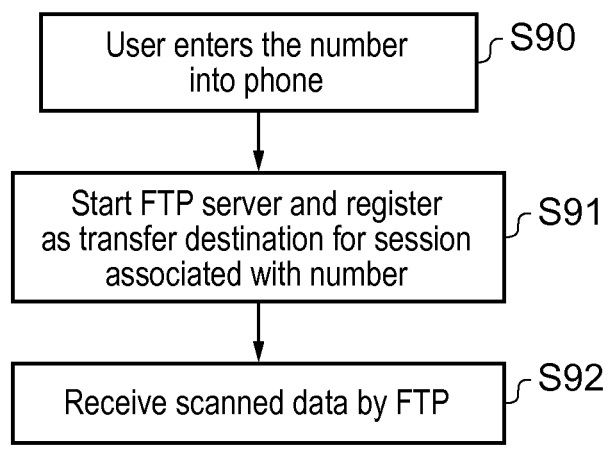
FIG. 8 shows steps performed at the mobile phone.
Figure 9:
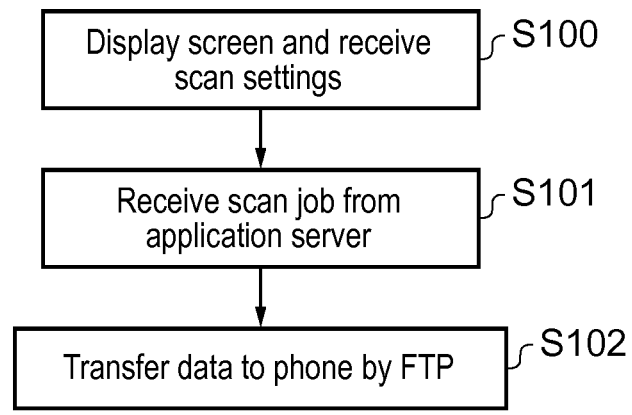
FIG. 9 shows steps performed at the MFP.

Operation of the image-processing system will now be described with reference to FIGS. 6 to 9. FIG. 6 is a flowchart showing steps performed by the web server 12, FIG. 7 is a flowchart showing steps performed by application server 13, FIG. 8 is a flowchart showing steps performed by the mobile phone 11, and FIG. 9 is a flowchart showing steps performed by the MFP 10. In each case, the steps are performed by an appropriately configured program or software running on the respective device on the hardware described earlier.

Figure 10:
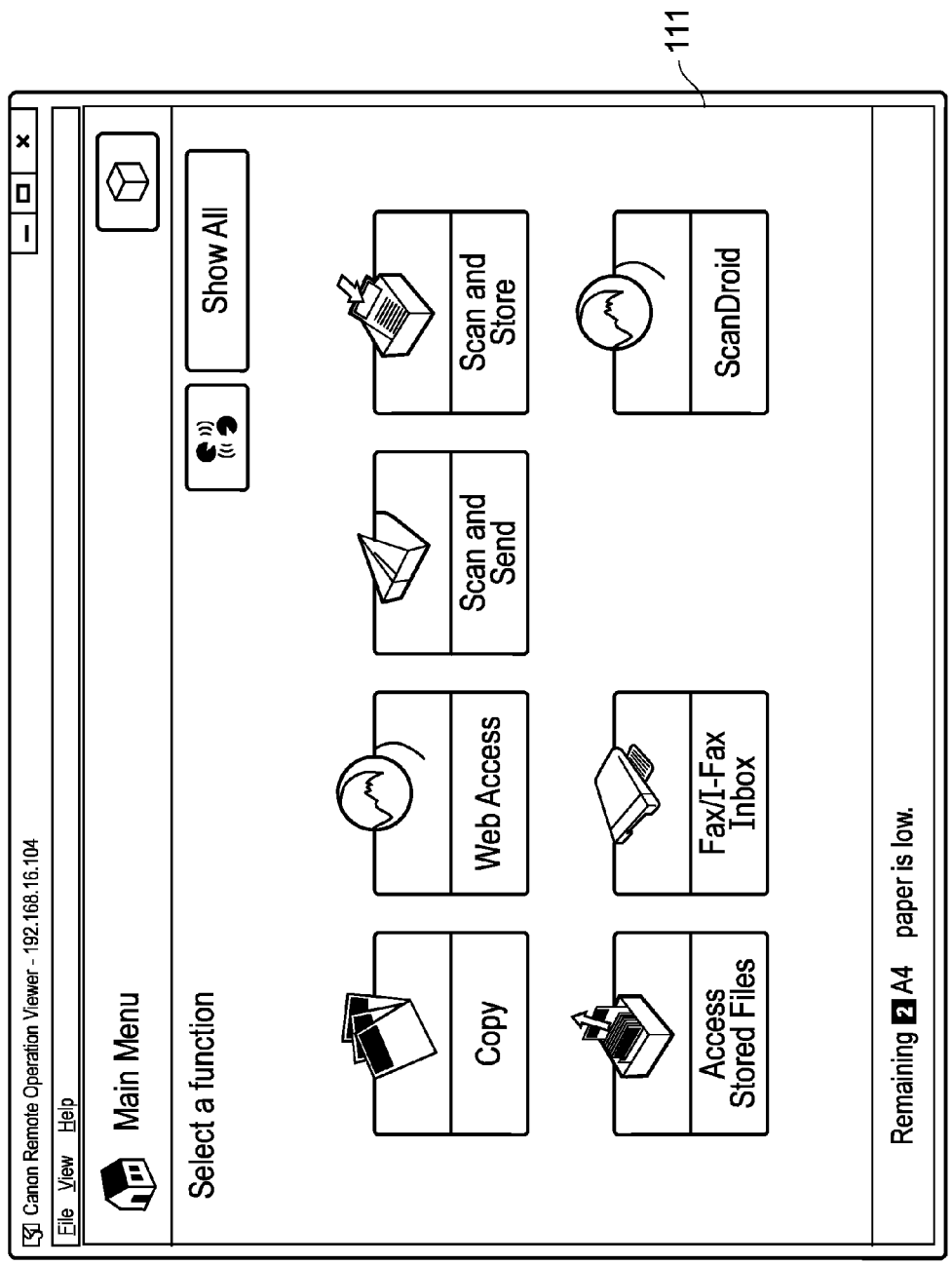
FIG. 10 shows a display of the MFP.
Figure 11:
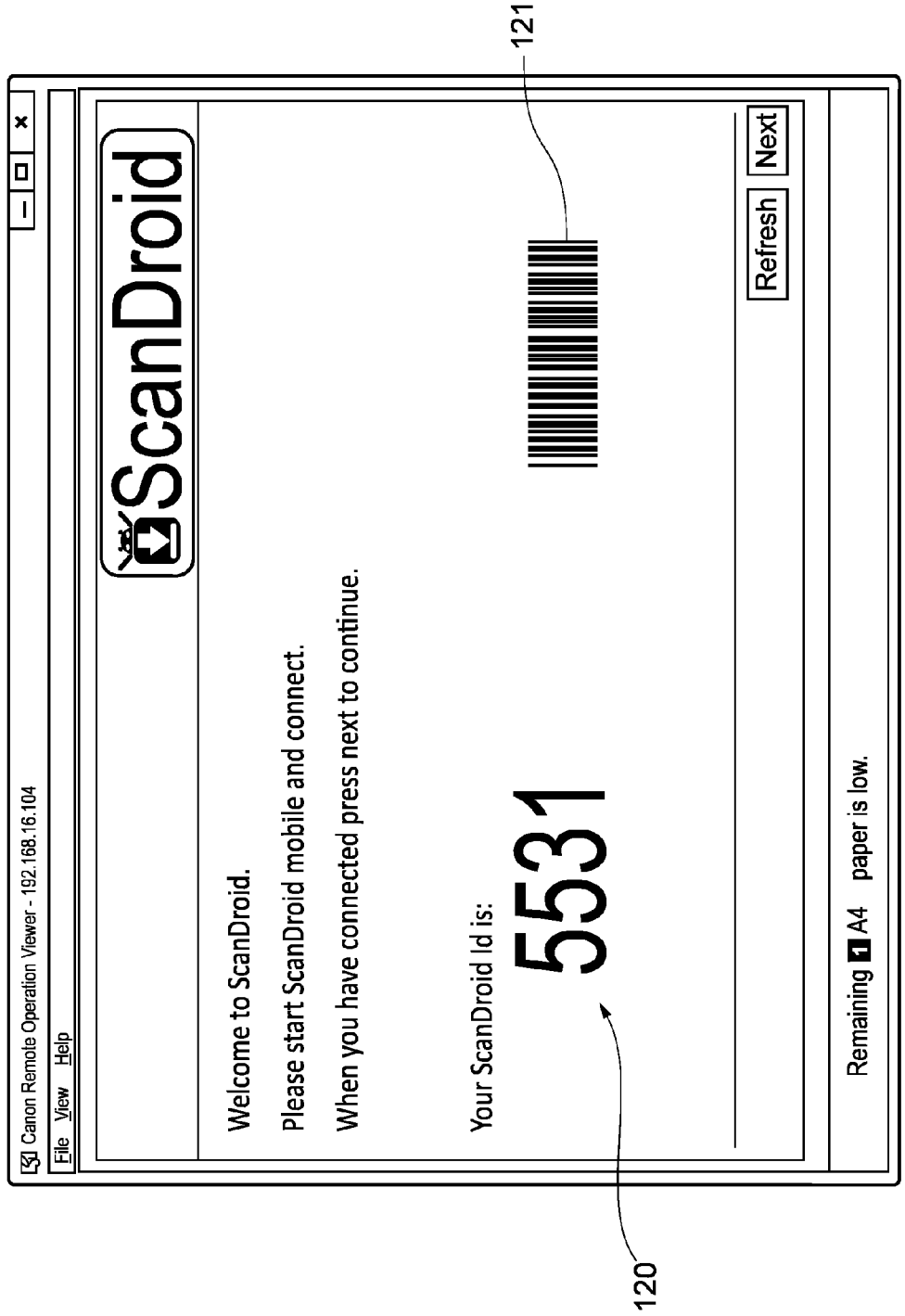
FIG. 11 shows another display of the MFP.

For purposes of illustration imagine a scenario in which a user holding the mobile phone 11 walks up to the MFP 10 and wishes to either scan to the mobile phone 11 or print from the mobile phone 11. When the user looks at the display unit 24 of the MFP 10, he or she sees a display corresponding to FIG. 10. The user uses the touch screen of the display unit 24 in order to select the 'scandroid' icon. Touching the icon on the touch screen launches the web browser 503 on the MFP 10. The web browser 503 requests a first page of the scandroid application from the web server 12 causing the scandroid application to be launched on the web server 12. The first page of the scandroid application is a web page shown in FIG. 11. Whilst generating the web page shown in FIG. 11, the web application 50 on the web server 12 generates a random number, s70. The generated number 110 is embedded in the web page by the presentation logic 501 and is displayed to the user in the web browser 503. At this time the application 50 also sends, S71, a message to the application server in order to generate a session. Upon receipt of this request, the application server 14 generates, S80, a session in the database 14. The generated session is identified by a sessionid, which is native to the database, and stores the random number as identification information in the session. The application server 13 also registers the MFP 10 as the source for transfers associated with the sessionid.

Figure 12:
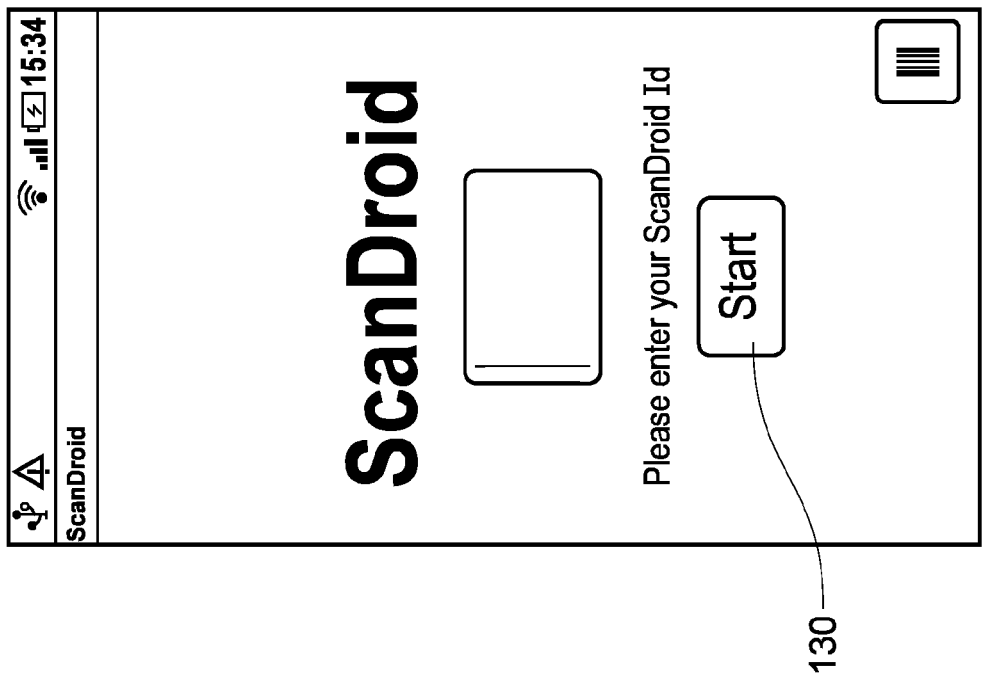
FIG. 12 shows a display of the mobile phone.

The user holding the mobile phone 11 next launches a scandroid application on the mobile phone 11 and is presented with the screen display shown in FIG. 12 on the display unit 32 of the mobile phone 11. At this time the scandroid application on the mobile phone 11 starts an FTP server on the mobile phone 11. The user uses the operation unit 33 of the mobile phone 11 to enter, S90, the generated identification number displayed on the display unit 24 of the MFP 10 into the mobile phone 11. The user then selects the start button 130 shown in FIG. 12.

The scandroid application on the mobile phone 11 is preconfigured with an IP address of the application server 13 allowing the mobile phone to communicate with the application server 14. After the user has selected the start button 130, the scandroid application on the mobile phone 11 causes the mobile phone 11 to send a request to register, S91, the mobile phone 11 as the destination for the session with an identification number corresponding to the entered number. This request includes details of the address of the FTP server running on the mobile phone 11. Upon receipt of this request, the application server registers, S81, the mobile phone 11 as the destination in connection with the session along with the FTP server details. In this way, the session including the generated identification number on the application server 13 includes information relating to both the MFP 10 as source device and the mobile phone 11 as destination device.

Figure 13:
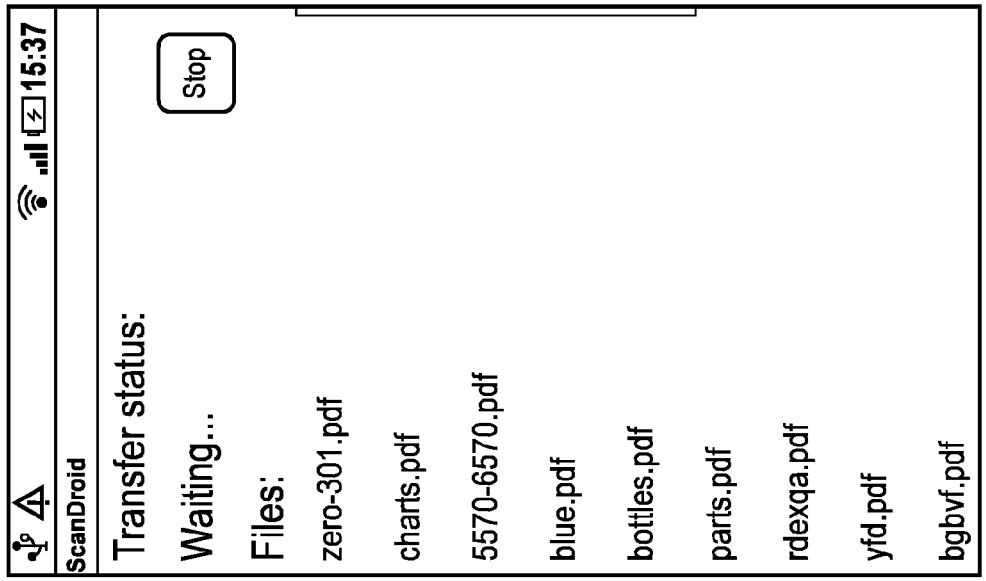
FIG. 13 shows another display of the mobile phone.

Next the mobile phone displays on display unit 32 a list of files stored on the mobile phone. This display is shown in FIG. 13.

Once the user has entered the identification number into the mobile phone 11, the user selects 'next' on the display of the MFP 10 shown in FIG. 12. The MFP 10 then displays a screen shown in FIG. 14 to allow the user to enter scan setting for use in the scanning operation, S100. The user may enter settings to specify color or mono scanning, a scanning resolution, a file format for the scanned document and a scanned document file name. The user then selects the start scan button 150.

In response to selection of the start scan button 150, the MFP notifies the web server 12 that the scan button 150 has been selected. The web server 12 receives the scan settings in step S72. The web server 12 sends a request for a scan job including the scan settings to the application server 13 in step S73. In response to receipt of the request for a scan job, S82, the application server adds the FTP server details of the mobile phone 11 stored in the session to the scan settings and sends a scan job to the SOAP interface 504 of the MFP 10, S83. Upon receipt of the scan job, S101, including scan settings and destination details, the MFP 10 performs the requested scan and sends, S102, the scanned document data to the FTP server on the mobile phone 11 over the Wi-Fi network.

The mobile phone 11 receives the scanned file, S92, and stores it in a memory on the mobile phone 11, thus completing the scanning operation.

If the user wishes to print from the mobile phone 11 to the printer 10, the user uses the scandroid application on the mobile phone 11 to select a file from a list of files stored on the mobile phone 11 and then selects a print command. The mobile phone 11 requests source device information from the application server 13, and then sends the selected file to LPR port 9100 of the MFP 10. The document to be printed must be stored or converted in the mobile phone 11 to a format that can be natively interpreted by the MFP 10, in this embodiment the file is sent in pdf format. In response to receiving the document, the MFP 10 prints the file.

Second Embodiment

In the first embodiment an association is set up between the MFP 10 and the mobile phone 11 based on the identification information, which is a random number generated by the web server 13. The web server 13 generates a web page in which the generated number is embedded so that the user can read the number when the web page is displayed in the web browser 503 of the MFP 10 In the second embodiment, step S90 is performed using barcodes. The web server generates a web page (see FIG. 11) in which a barcode 121 is embedded, the barcode 121 encoding the generated number.

In the second embodiment, when the user launches the scandroid application on the mobile phone 11, the camera unit 34 is activated and the images collected by the camera unit 34 are displayed in a window on the display unit 32. The user directs the camera unit 34 towards the display unit 24 of the MFP 10, which is displaying the web page with the embedded barcode 121. When the barcode 121 is in view of the camera, the mobile phone 11 automatically performs barcode recognition in order to extract the number from the barcode 121 displayed on the display unit 24 of the MFP 13.

The number extracted from the barcode is used by the mobile phone as the identification information in the same manner as described in the first embodiment. Accordingly, the description of the other operations of the image-processing system of the first embodiment will not be repeated.

The second embodiment is advantageous in the identification information can be obtained by 'scanning' the display unit 34 of the MFP 10 with the mobile phone 11. In embodiments where the generated number itself is not displayed, it is more difficult, in a case that there is a queue of users waiting to use the MFP 10, for another user to make use of the identification information if they are not directly in front of the MFP 10. The second embodiment also has the advantage that it requires fewer button presses for a user and in that it speeds up the overall scanning method.

Third Embodiment

In a third embodiment of the invention, the identification information is generated based on GPS co-ordinates of the MFP 10. The MFP 10 generates a session at the application server 13 and stores in the session a first predetermined number of the GPS co-ordinates identifying the location of the MFP 10.

In a case that a user wishes to scan from the MFP 10, the user places the mobile phone 11 on the MFP 10 and opens the scandroid application on the mobile phone. The scandroid application accesses a GPS unit on the mobile phone 11 and identifies GPS coordinates identifying the mobile phone's position. The scandroid application on the mobile phone 11 selects the first predetermined number of GPS coordinates and uses these coordinates as identification information to identify the session for registering as the destination device. As the mobile phone 11 and the MFP 10 are in the same location (the mobile phone 11 is resting on the MFP 10) the identification information registered for the MFP 10 matches the identification information generated by the mobile phone 11 allowing the mobile phone 11 and MFP 10 to use the same session.

The identification information can be selected to be the first predetermined number of digits of the GPS position in any coordinate format. The predetermined number of coordinates should preferably be selected so that the location of the MFP 10 is identified to within a reasonable degree of accuracy. If too many coordinates are selected and the degree of accuracy is too high, the mobile phone 11 and MFP may not agree on their locations and they will not generate the same identification information. This will cause the image-processing system to fail. On the other hand, if too few digits of the GPS location are used, there may be a problem that two or more MFPs try to use the same identification information. This problem can be overcome by displaying a list of MFPs 10 registered in the session on the display unit 32 of the mobile phone 11 and allowing the user to select the appropriate MFP 10. In many cases, the predetermined number of coordinates should specify accuracy to within a few meters.

Fourth Embodiment

In order to overcome the problems identified above in the third embodiment, the fourth embodiment makes use of proximity in order to allow the mobile phone 11 to access the same session as the MFP 10.

In the fourth embodiment, the web server 12 sends a request to generate a session at the application server 13 and registers the MFP 10 as a source device in the generated session. The request from the web server 12 includes coordinates identifying the location of the MFP 10, which are stored in the generated session by the application server 13.

When he or she wants to scan, the user brings the mobile phone 11 close to the MFP 10 and starts the scandroid application on the mobile phone 11. The scandroid application on the mobile phone 11 sends a request to register the mobile phone 11 as the destination device to the application server 13, including coordinates of its location identified from the built in GPS unit.

When the application server 13 receives the registration request from the mobile phone 11, it searches the sessions in the database in order to identify sessions with registered source devices that are located within a predetermined range of the mobile phone. The predetermined range may be, say, 5 meters.

If the application server finds no sessions with source devices within the predetermined range of the mobile phone 11, the application sends the mobile phone 11 an error message and the connection process fails.

If the application server 13 finds a single session with a source device within the predetermined range of the mobile phone 11, the application server 13 identifies the session in which the source device is registered as the appropriate session and registers the mobile phone 11 as the destination device for that session.

If the application server 13 finds more than one session including a source device located within the predetermined range of the mobile phone 11, the application server 13 returns information indicating the identity of the sessions and corresponding source devices within range of the mobile phone 11. Upon receipt of this information the mobile phone 11 displays a list of the sessions and corresponding source devices on the mobile phone 11 in order to allow a user to select the appropriate source device from which he or she wishes to use to scan. Once the user has selected the appropriate session and source device, the selection is sent from the mobile phone 11 to the application server 13 and the application server registers the mobile phone 11 as the destination device in the appropriate session.

After the mobile phone 11 is registered as destination device in the appropriate session, the method proceeds as previously described in connection with the first embodiment. The image-processing apparatus of the fourth embodiment allows easier operation in a case where there are multiple MFPs in a small area and allows the user to select the appropriate MFP 10 to scan from.

Fifth Embodiment

Figure 14:
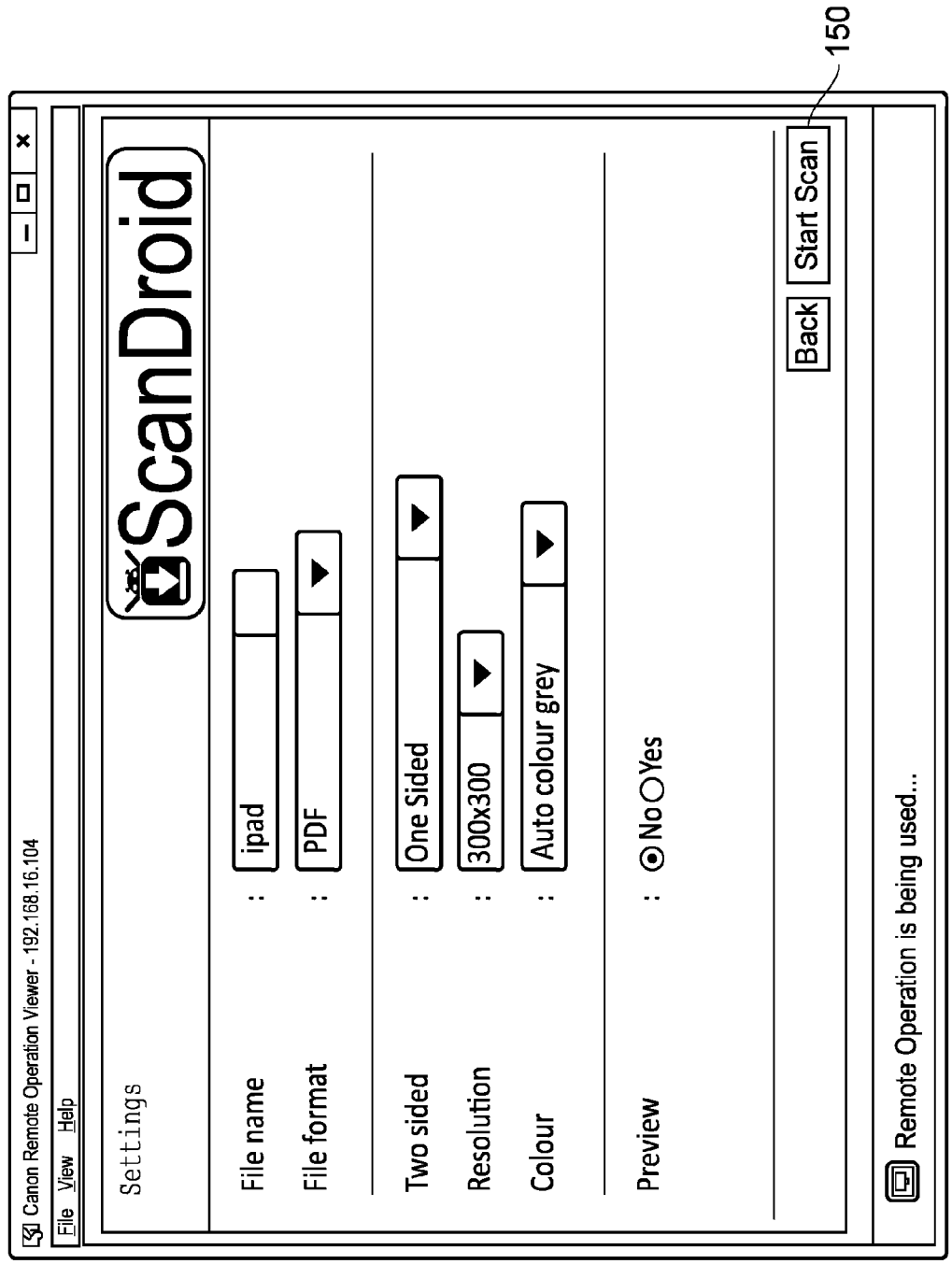
FIG. 14 shows another display of the MFP.
Figure 15:
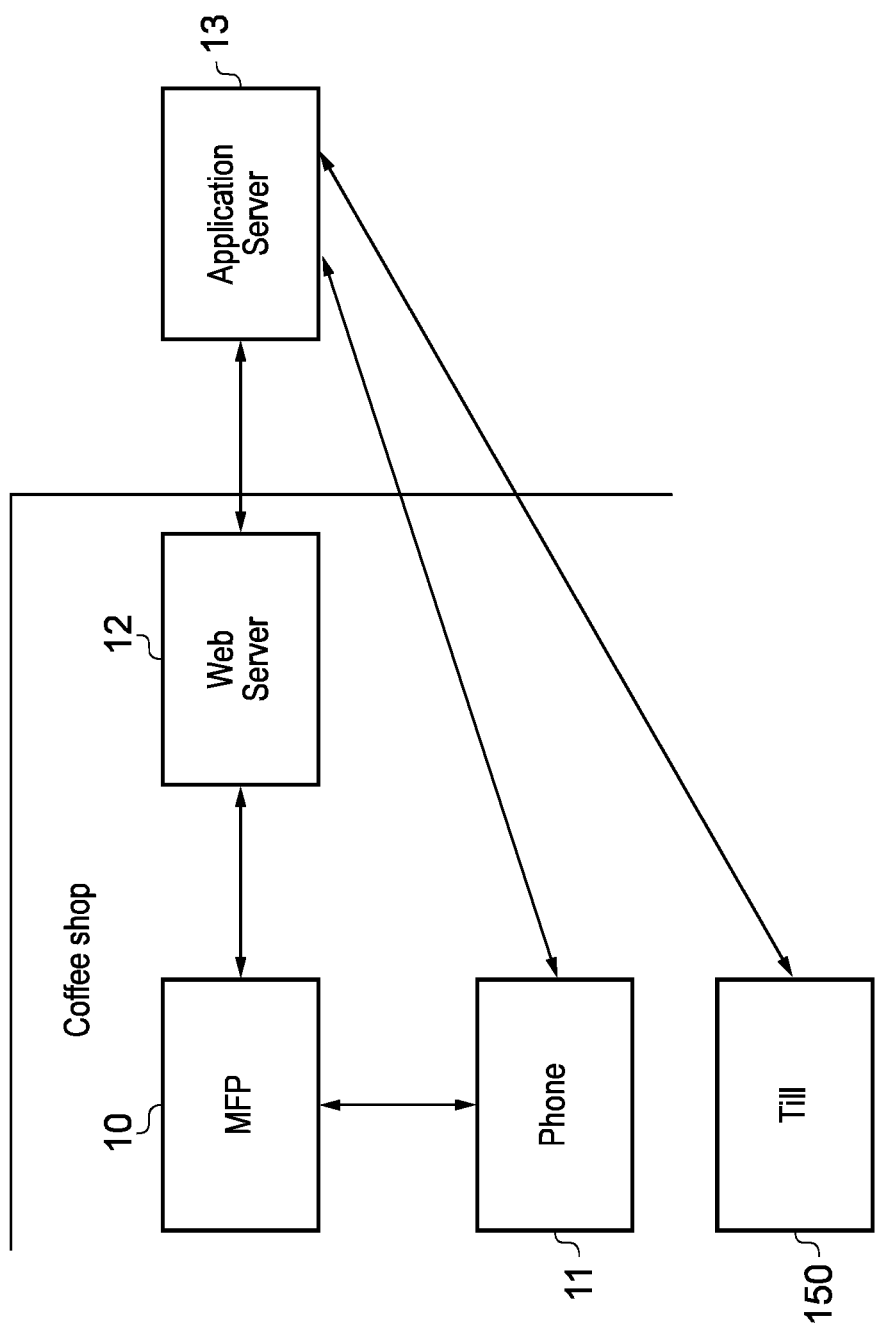
FIG. 15 shows a configuration of the fifth embodiment.

FIG. 14 shows a more commercial embodiment of the invention. The MFP 10 and web server 13 are set up in a coffee shop. A user carrying the mobile phone enters the coffee shop and wishes to print to the MFP 10. The application server 13 is located outside of the coffee shop premises and may be a shared resource with other coffee shops (for example if the coffee shop is part of a chain).

Similar to the first and second embodiments, the web server 12 sends a request to register the MFP 10 at the application server 13 using a generated random number. The application server 13 receives this request and generates a session with identification information corresponding to the generated number. This process is automatically performed on a daily basis, with a new session with different identification information being generated overnight when the coffee shop is closed. As with the second embodiment, the identification information is encoded in a barcode. However, in the fourth embodiment, the barcode is generated at the application server 13 and is sent to a till 150 in the coffee shop.

In a case that a user wishes to print to and/or scan from the MFP 10, the user needs to make a purchase at the till 150. The ability to use the coffee shop's MFP 10 may be subject a separate charge or provided as a complimentary service to the coffee shop's customers. When the user has made an appropriate purchase, the user is given a receipt with the barcode printed on it.

At this stage, as the user has walked in from the street, the mobile phone does not know the address of the application server that it should contact with a request. The address information may be configured on the user's phone in one of several different ways. Firstly, the application-server address information may be displayed in the coffee shop and the user may enter this information into a scandroid application on the mobile phone 11 manually. Alternatively, different versions of the scandroid application may be available for download to the user's mobile phone with the application server details already pre-configured within it. For example, the user may download a scandroid application that allows printing and/or scanning within a particular chain of coffee shops, the downloaded scandroid application having the details of the application server 13 for that serves the MFPs 10 of that chain of coffee shops pre-configured. A third way of configuring the address of the application server 13 is to provide the address of the application server 13 in a barcode on the till receipt. In such embodiments, the till receipt includes two barcodes, a first barcode that encodes information about the address of the application server and a second barcode that encodes identification information of the session for accessing MFP 10.

In order to print or scan, the user opens the appropriate scandroid application on the mobile phone 11 and scans the barcode on the till receipt in the manner described in connection with the second embodiment. If the address of the server is to be obtained by scanning a separate barcode on the till receipt, the scanning process involves two scanning steps, a first in which the barcode encoding the address of the application server 13 is read and decoded by the mobile phone 11 and a second in which the barcode encoding the identification information is read and decoded by the mobile phone 11.

The embodiment then proceeds as described previously to allow the user to print to and/or scan from the MFP 10. As noted above, the identification information is automatically changed on a daily basis, so that a user may use the barcode on his or her receipt to print and/or scan on the day of purchase, but will not be able to print or scan on another day because the identification information encoded in the barcode will have changed and the mobile phone 11 will fail to find the session of the MFP 10 on the application server 13.

In contrast to the first embodiment, the fourth embodiment involves communication across multiple networks. The MFP 10 and web server 12 communicate with each other via a LAN internal to the coffee shop. The application server 13 is connected to the internet and is accessible by the web server 13 and the mobile phone 11 via a web interface.

Other Embodiments

Embodiments of the present invention have been described above in which data is transferred between the MFP 10 and the mobile phone 11 over a Wi-Fi network. However, this is not necessarily the case and many other types of connection could be used. In some other embodiments the data is uploaded and/or downloaded between the mobile phone 11 and the MFP 10 via the web server 12. The mobile phone sends and receives data from the web server 12 using FTP over a 3G connection on the mobile phone 11. In such embodiments the data is transferred to or from the MFP 10 by the web server 13 via a LAN using FTP or HTTP.

The embodiments above have described scanning documents placed on the image reader 27 of the MFP 10 and sending the scanned document to the mobile phone 11. However, in another embodiment the user may scatter a collection of business cards on the image reader 27 of the MFP 10. In this embodiment, as before, the MFP 10 performs a scanning operation in response to a user's command entered on the MFP's user interface and invoked via the MFP's SOAP/HTTP interface. However, instead of immediately sending the scanned image data to the mobile phone 11 via FTP, the scanned data is first sent to the web server 13. The web server receives the scanned data and makes use of OCR and form recognition software installed on the web server 13. The form recognition software recognizes that the received scanned image corresponds to a collection of business cards and the OCR software identifies details on the business cards such as name, telephone number, address, etc. The web server 13 then converts the extracted data into a business card format, such as vcard. The extracted vcard details are then embedded in a web page and the sent to the MFP 10 for display. The user then looks at the displayed web page on the display unit 24 to confirm the accuracy of the extracted vcard details before selecting a send option in the displayed web page. Selection of the send option by the user causes FTP transfer of the business cards in the vcard format to the mobile phone 11 using the FTP transfer method previously described in connection with the transfer of scanned image data. An advantage of this embodiment is that the vcard details (in XML format) are more useful and significantly smaller in size that the original document scanned by the MFP 10.

The first to fourth embodiments of the present invention include a separate MFP, web server, application server, and database. However, in other embodiments of the invention the function of the web server may be included in the MFP.

In yet further embodiments the function of the application server may be included in the MFP. In such embodiments, the image processing system may include a plurality of MFPs and one of the MFPs may be configured to act as the application server, performing the function of the application server described above in the embodiments. Such a 'lead' MFP manages requests from the other MFPs and the mobile phone.

The functions of the web server and/or application server, when they are included in the MFP, may be provided by software and/or hardware in the MFP housing or be provided by connection of appropriate additional devices to the MFP.

Embodiments of the present invention have been described above. Further embodiments of the present invention can also be realized by systems that read out and execute programs recorded on a memory device to perform the functions of the above-described embodiment(s), and by a method, the steps of which are performed by, for example, reading out and executing a program recorded on a memory device to perform the functions of the above-described embodiment(s). For this purpose, the program may be provided to the image-processing system, for example via a network or from a recording medium of various types serving as the memory device (e.g., computer-readable medium).

The invention claimed is:

1. An image-processing system comprising:
   a peripheral apparatus that functions as at least one of a printer, a fax machine, and a scanner, the peripheral apparatus being configured to send a registration request to register communication parameters of the peripheral apparatus in association with a piece of identification information and configured to provide the piece of identification information to one of a user and a mobile device;
   a server configured to receive the registration request from the peripheral apparatus and to register the communication parameters of the peripheral apparatus in association with the piece of identification information; and
   a mobile device configured to receive the piece of identification information provided by the peripheral apparatus and to send a request to the server with the received piece of identification information in order to register the communication parameters of the mobile device in association with the piece of identification information, wherein the server is configured to associate the registered details of the peripheral apparatus with the request from the mobile device thereby allowing a connection to be configured between the mobile device and the peripheral apparatus, and wherein:

the piece of identification information is a code, the peripheral apparatus is configured to provide the code to a user, and the mobile device is configured to receive the identification information by entry of the code into the mobile device by the user.

2. An image-processing system according to claim 1, wherein:

the peripheral apparatus is configured to provide a machine-readable code encoding the piece of identification information; and the mobile device is configured to receive the piece of identification information by reading and decoding the machine-readable code provided by the peripheral-apparatus.

3. An image-processing system according to claim 1, wherein the identification information is a random number.

4. An image-processing system according to claim 1, wherein the peripheral apparatus is configured to generate the identification information.

5. An image-processing system according to claim 1, wherein:

the piece of identification information is derivable from a position of the peripheral apparatus; and the mobile device is configured to determine the piece of identification information by detecting a position of the peripheral apparatus.

6. An image-processing system according to claim 1, wherein the connection between the mobile device and the peripheral apparatus is configured by at least one of the mobile device and the peripheral apparatus retrieving the other device's stored parameters from the server.

7. An image-processing system according to claim 1, wherein the mobile device is further configured to determine the parameters to allow communication with the server.

8. An image-processing system according to claim 7, wherein the mobile device is configured to determine the parameters to allow communication with the server by reading and decoding a machine readable code.

9. An image-processing system according to claim 7, wherein:

the peripheral apparatus is configured to provide a machine-readable code encoding the communication parameters of the server; and the mobile device is configured to determine the communication parameters of the server by reading and decoding the machine-readable code provided by the peripheral apparatus.

10. An image-processing system according to claim 1, wherein the peripheral apparatus consists of a peripheral device or the peripheral apparatus consists of a peripheral device connected to an associated server.

11. An image-processing system according to claim 1, wherein the server is included in a peripheral apparatus.

12. An image-processing apparatus according to claim 2, claim 8, or claim 9, wherein the machine-readable code is a bar code or a QR code.

13. An image-processing method for an image-processing apparatus comprising a peripheral apparatus, a server and a mobile device, the peripheral apparatus functioning as at least one of a printer, a fax machine and a scanner, the method comprising:

the peripheral apparatus sending a registration request to register communication parameters of the peripheral apparatus in association with a piece of identification information at the server and providing the piece of identification information to one of a user and a mobile device;

the server receiving the registration request and registering the communication parameters of the peripheral apparatus in association with the piece of identification information;

the mobile device receiving the piece of identification information provided by the peripheral apparatus and sending a request to the server with the received piece of identification information in order to register the communication parameters of the mobile device in association with the piece of identification information; and the server associating the registered details of the peripheral apparatus with the request from the mobile device thereby allowing a connection to be configured between the mobile device and the peripheral apparatus, wherein:

the piece of identification information is a code, the peripheral apparatus is configured to provide the code to a user, and the mobile device is configured to receive the identification information by entry of the code into the mobile device by the user.

14. One or more non-transitory storage media storing a suite of programs that, when executed on an image-processing system, causes the image-processing system to perform a method for an image-processing system comprising a peripheral apparatus, a server and a mobile device, the peripheral apparatus functioning as at least one of a printer, a fax machine, and a scanner, the method comprising:

the peripheral apparatus sending a registration request to register communication parameters of the peripheral apparatus in association with a piece of identification information at the server and providing the piece of identification information to one of a user and a mobile device;

the server receiving the registration request and registering the communication parameters of the peripheral apparatus in association with the piece of identification information;

the mobile device receiving the piece of identification information provided by the peripheral apparatus and sending a request to the server with the received piece of identification information in order to register the communication parameters of the mobile device in association with the piece of identification information; and the server associating the registered details of the peripheral apparatus with the request from the mobile device thereby allowing a connection to be configured between the mobile device and the peripheral apparatus, wherein:

the piece of identification information is a code, the peripheral apparatus is configured to provide the code to a user, and the mobile device is configured to receive the identification information by entry of the code into the mobile device by the user.

15. An image-processing system comprising:

a peripheral apparatus that functions as at least one of a printer, a fax machine and a scanner, the peripheral apparatus comprising means for sending a registration request to register communication parameters of the peripheral apparatus in association with a piece of identification information and configured to provide the piece of identification information to one of a user and a mobile device;

a server comprising means for receiving the registration request from the peripheral apparatus and means for registering the communication parameters of the peripheral apparatus in association with the piece of identification information; and a mobile device comprising means for receiving the piece of identification information provided by the peripheral apparatus and means for sending a request to the server with the received piece of identification information in order to register the communication parameters of the mobile device in association with the piece of identification information, wherein the server is configured to associate the registered details of the peripheral apparatus with the request from the mobile device thereby allowing a connection to be configured between the mobile device and the peripheral apparatus, wherein:

the piece of identification information is a code, the peripheral apparatus is configured to provide the code to a user, and the mobile device is configured to receive the identification information by entry of the code into the mobile device by the user.

* * * * *